(12) United States Patent
Higuchi

(10) Patent No.: US 6,347,179 B1
(45) Date of Patent: Feb. 12, 2002

(54) VIDEO SIGNAL PROCESSOR

(75) Inventor: Yoshio Higuchi, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/060,754

(22) Filed: Apr. 16, 1998

Related U.S. Application Data

(62) Division of application No. 08/510,837, filed on Aug. 3, 1995, now Pat. No. 5,987,209.

(30) Foreign Application Priority Data

| Aug. 5, 1994 | (JP) | 6-184496 |
| Oct. 26, 1994 | (JP) | 6-262186 |
| Mar. 6, 1995 | (JP) | 7-1416 |
| Mar. 6, 1995 | (JP) | 7-1417 |

(51) Int. Cl.[7] .............................................. H04N 9/79
(52) U.S. Cl. .......................................... 386/17; 386/19
(58) Field of Search ................................. 386/1, 10, 11, 386/12, 13, 17, 19; H04N 9/79

(56) References Cited

U.S. PATENT DOCUMENTS

| 4,110,761 A | * | 8/1978 | Watatani | 386/19 |
| 4,208,674 A | * | 6/1980 | Kuniyoshi et al. | 386/19 |
| 4,845,564 A | * | 7/1989 | Hakamada et al. | 348/565 |
| 5,083,213 A | * | 1/1992 | Yasuda | 386/19 |

FOREIGN PATENT DOCUMENTS

| JP | 61-238180 | 10/1988 |
| JP | 5-122657 | 5/1993 |
| JP | 56-29577 | 5/1997 |

* cited by examiner

*Primary Examiner*—Huy Nguyen
(74) *Attorney, Agent, or Firm*—Bacon & Thomas

(57) ABSTRACT

A video signal processor which includes a reference signal generating circuit provided with at least an oscillation circuit for generating a reference signal corresponding to a burst signal and a Y/C separation circuit for separating a video signal into a luminance signal and a chrominance signal with an output of the reference signal generating circuit as a clock signal, and uses a microcomputer for controlling the entire operation of the video signal processor. In the video signal processor, an output of the reference signal generating circuit is also supplied to the microcomputer as a clock signal.

3 Claims, 8 Drawing Sheets

VIDEO SIGNAL PROCESSOR

This application is a Division of nonprovisional application Ser. No. 08/510,837 filed Aug. 3, 1999, U.S. Pat. No. 5,987,209.

BACKGROUND OF THE INVENTION

1. Field of the Invention

This invention relates to a video signal processor having an oscillation circuit for generating a reference signal or the like using a crystal unit.

2. Description of the Related Art

A video cassette recorder uses a microcomputer for controlling the operation of the main unit and the rotation speed of a capstan motor and the like. The microcomputer is adapted to also keep the time of day at the power outage time when the commercial power supply is stopped.

FIG. 1 shows the related art for performing the above operation, wherein a microcomputer 291 is provided with two oscillation circuits 295 and 296. A 32.768-kHz crystal unit 292 is connected to the oscillation circuit 295 and a 12-MHz crystal unit 293 is connected to the oscillation circuit 296.

In the operation standby state, only the oscillation circuit 295 is operated and an output thereof is led to a central processing unit (CPU) 297. Thus, the microcomputer 291 performs the time-keeping operation with less power consumption, and also performs the control operation required in the standby state.

On the other hand, when the operation state is entered, an output of the oscillation circuit 296 is led to the CPU 297. Thus, the microcomputer 291 performs the high-speed operation in accordance with a high-frequency clock signal for controlling the rotation speed of the capstan motor and the like, or other operations.

As described above, the crystal unit 292 for generating a clock signal in the standby state and the crystal unit 293 for generating a clock signal in the operation state are connected to the microcomputer 291. That is, the microcomputer 291 requires two crystal units 292 and 293. However, since the crystal units 292 and 293 are expensive devices, use of the two crystal units 292 and 293 results in a rise in cost of the video cassette recorder.

To enhance accuracy and stability of the receiving frequencies, a video signal receiver such as a video cassette recorder, a television set, and the like, uses a phase locked loop (PLL) circuit to generate a local oscillation signal of a predetermined frequency for determining the receiving frequency. In such a configuration, a reference signal for making a phase comparison with an output of a local oscillation circuit is indispensable. Thus, in a conventional receiver, the PLL circuit is provided with an exclusive crystal unit for generating the reference signal.

However, the crystal unit is an expensive device as described above and in case of using a PLL circuit for determining the receiving frequency, the number of crystal units to be used is increased, resulting in a rise in cost of the system.

FIG. 2 is a block diagram showing the configuration of a conventional video cassette recorder with a television set. That is, a tuner unit 391 takes out a video signal from a received signal and sends the taken-out video signal to a recording/reproducing unit 396. At the operation time except reproduction, a video signal processing unit 393 generates primary-color chrominance signals of R, G, and B from the video signal received through the recording/reproducing unit 396 from the tuner unit 391. A cathode-ray tube (CRT) unit 394 amplifies the primary-color chrominance signals generated by video signal processing unit 393 to a predetermined level and drives a CRT by the amplified primary-color chrominance signals. At the recording time, the recording/reproducing unit 396 applies predetermined processing to the video signal for generating a signal to be recorded, and feeds the generated signal into a rotary head 397. At the reproducing time, the recording/reproducing unit 396 applies predetermined processing to a reproduced signal output from the rotary head 397 for reproducing the video signal, and outputs the reproduced video signal to the video signal processing unit 393. As a result, an image is displayed on the CRT unit 394 by the reproduced video signal.

In the operation described above, the video signal processing unit 393 requires a signal (reference subcarrier) phase-synchronized with a burst signal in the video signal. Thus, the video signal processing unit 393 uses a crystal unit 395 to generate a reference subcarrier. The recording/reproducing unit 396 requires a reference subcarrier at the recording time and a reference signal used as reference of a burst signal at the reproducing time. Thus, the recording/reproducing unit 396 uses a crystal unit 398 to generate a reference subcarrier at the recording time and a reference signal at the reproducing time. The crystal units 395 and 398 are connected to the video signal processing unit 393 and the recording/reproducing unit 396 respectively. However, since the crystal units are expensive devices as described above, use of two crystal units results in a rise in the total cost of the parts to be used, raising a large bottleneck for reducing the manufacturing cost.

SUMMARY OF THE INVENTION

It is therefore an object of the invention to provide a video signal processor which can reduce the number of crystal units to be used.

In order to attain the above object, the invention provides a video signal processor including: a reference signal generating circuit provided with at least an oscillation circuit for generating a reference signal corresponding to a burst signal; a Y/C separation circuit for separating a video signal into a luminance signal and a chrominance signal with output of the reference signal generating circuit as a clock signal; and a microcomputer for controlling an operation of the video signal processor with the output of the reference signal generating circuit as a clock signal.

Further, the invention provides a video signal recording medium reproducer including: a reproducing unit for reproducing a video signal recording medium; a chrominance signal restoration circuit for restoring a chrominance signal based on a signal reproduced from the video signal recording medium by the reproducing unit; a reference signal generating circuit for supplying a reference signal corresponding to a carrier of the chrominance signal to the chrominance signal restoration circuit; and a microcomputer for controlling an operation of the video signal recording medium reproducer with the reference signal from the reference signal generating circuit as a clock signal.

Furthermore, the invention provides a video signal receiver including: a mixer circuit for making frequency conversion of an RF signal from an RF amplifier circuit to an IF signal based on a local oscillation signal from a local oscillation circuit; a PLL circuit for setting an output frequency of the local oscillation circuit to a frequency corresponding to a receiving frequency by making a phase comparison between the local oscillation signal and a first reference signal; and chrominance signal circuit for generating a chrominance signal by using a second reference signal based on the IF signal from the mixer circuit, wherein the second reference signal is also supplied to the PLL circuit as the first reference signal.

Still further, the invention provides a video cassette recorder with a television set including: a recording/reproducing unit for generating a recording signal based on a video signal fed from a tuner unit and outputting the generated recording signal to a rotary head at a recording time and for generating a video signal based on a reproduced signal output from the rotary head and outputting the generated video signal at a reproducing time; and a video signal processing unit for generating a primary color chrominance signal from the same video signal as the video signal fed into the recording/reproducing unit at the recording time and for generating a primary color chrominance signal from the video signal generated by the recording/reproducing unit at the reproducing time, wherein the recording/reproducing unit includes an oscillation circuit for executing oscillation phase-synchronized with a burst signal of the video signal fed from the tuner unit at an operation time except the reproducing operation and for oscillating a reference signal used as reference of the burst signal and supplying the reference signal to the video signal processing unit as a reference subcarrier at the reproducing time.

DETAILED DESCRIPTION OF THE PREFERRED EMBODIMENTS

Referring now to the accompanying drawings, there are shown preferred embodiments of the invention.

First Embodiment

Figure 1:
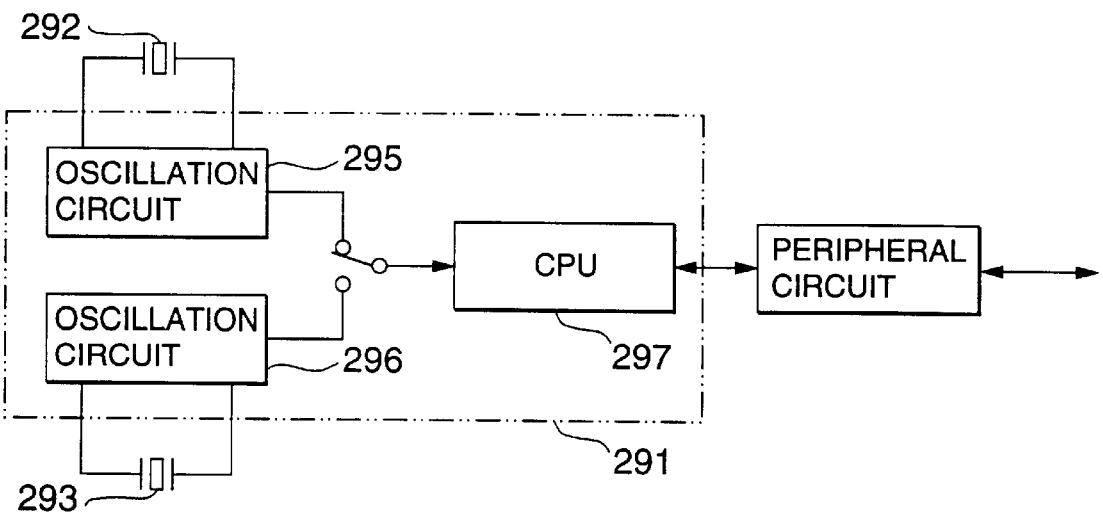
FIG. 1 is a block diagram showing the configuration of a microcomputer in a conventional video cassette recorder.
Figure 2:
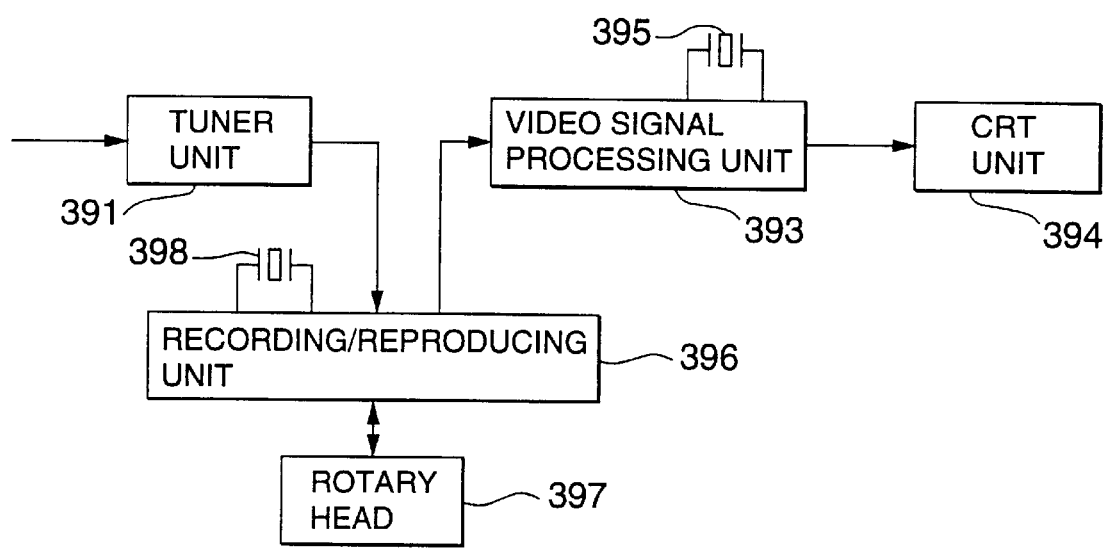
FIG. 2 is a block diagram showing the electric configuration of a conventional video cassette recorder with a television set.
Figure 3:
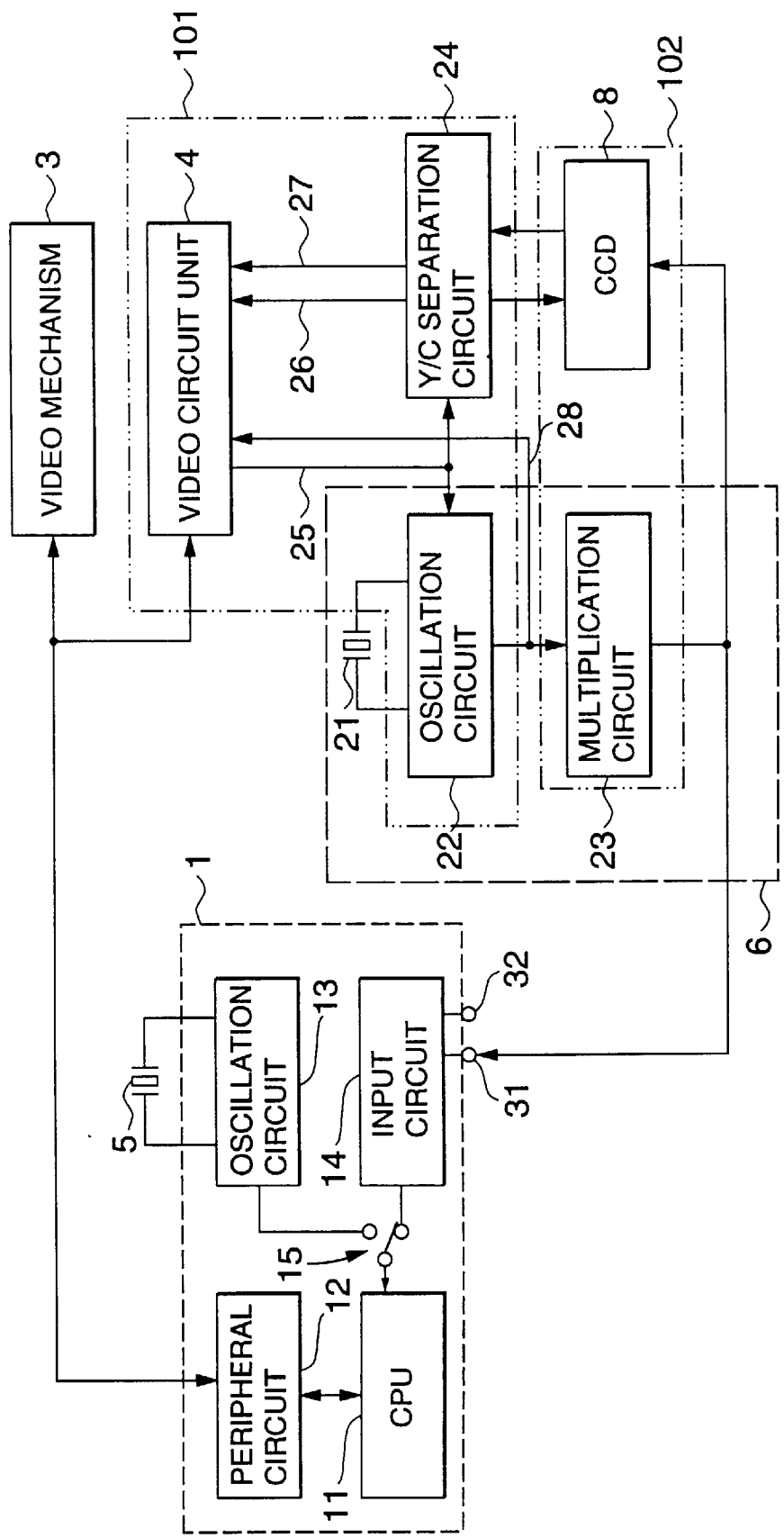
FIG. 3 is a block diagram showing the electric configuration of a first embodiment of the invention.

FIG. 3 is a block diagram showing the electric configuration of a video signal processor according to a first embodiment of the invention.

The video signal processor according to the invention is an apparatus containing signal processing of separating a video signal, which is a composite signal, into a luminance signal and a chrominance signal as processing in the main unit; specifically, it is a television set, a video cassette recorder, or the like for processing a video signal such as an NTSC, PAL, or SECAM signal. The embodiment provides a video cassette recorder handling the NTSC signal.

A microcomputer 1, which is a block for controlling the video cassette recorder operation, includes a CPU 11 which is the nucleus of control, a peripheral circuit 12 which serves as an interface between the CPU 11 and the outside, an oscillation circuit 13 to which a 32.768-kHz crystal unit 5 is connected, an input circuit 14 to which an external clock signal is input, and a switch 15 for switching an output of the oscillation circuit 13 and an output of the input circuit 14 into the CPU 11. The microcomputer 1 also includes a pair of clock signal terminals 31 and 32 connected to the input circuit 14.

A video mechanism 3 is a block including a rotary head, a capstan motor, a loading mechanism, and other components. The rotation speed of the capstan motor, loading operation, and the like are controlled by the microcomputer 1 bidirectionally connected to the video mechanism 3.

A video circuit unit 4 is a block for recording a received video signal or a video signal fed from the outside in a video cassette and applying predetermined processing to a signal reproduced from a video cassette to generate a video signal and sending the generated video signal to the outside. The recording operation and reproducing operation are controlled by the microcomputer 1 bidirectionally connected to the video circuit unit 4.

A reference signal generating circuit 6 includes an oscillation circuit 22 using a 3.58-MHz crystal unit 21 as an oscillation device for generating a reference signal 28 phase-synchronized with a burst signal in a video signal 25 and a multiplication circuit 23 for multiplying the frequency of the reference signal 28 generated by the oscillation circuit 22 by four. The reference signal 28 generated by the oscillation circuit 22 is sent to the video circuit unit 4 as a signal for detecting a color-difference signal. The reference signal of which frequency was multiplied by four by the multiplication circuit 23 (14.32 MHz) is sent to a delay device (CCD) 8 and the input circuit 14 as a clock signal.

A Y/C separation circuit 24, which is a comb filter, is connected to the CCD 8 for delaying a video signal by using the reference signal of which frequency was multiplied by the multiplication circuit 23 as a clock signal. The Y/C separation circuit 24 separates the video signal (composite signal) 25 output from the video circuit unit 4 into a chrominance signal 26 and a luminance signal 27 by detecting line correlation, and returns the chrominance signal 26 and the luminance signal 27 to the video circuit unit 4.

The operation of the embodiment having the above-described configuration will be discussed.

In the standby state in which the commercial power is supplied and the video cassette recorder operation is not performed, power is supplied to the microcomputer 1, but not to the video mechanism 3, the video circuit unit 4, and other circuits. The switch 15 leads an output of the oscillation circuit 13 to the CPU 11. Thus, the microcomputer 1 performs the low-speed operation using an about 32-Khz signal as a clock signal for controlling the time-keeping operation and the operation set as in the standby state, which is to detect handling of a power switch as a start instruction of the video cassette recorder operation, start instruction of the operation from a remote control unit or the like. In the power outage state in which the commercial power supply is stopped, the microcomputer 1 performs the time-keeping operation with a backup power supply (not shown).

When an operation start instruction is given in the standby state, the microcomputer 1 controls power supply to the video mechanism 3, the video circuit unit 4, and other circuits. Next, the microcomputer 1 switches connection of the switch 15 for leading an output of the input circuit 14 to the CPU 11. Thus, the CPU 11 shifts from the low-speed operation using the about 32-Khz signal as a clock signal to the high-speed operation using the about 14-MHz signal output from the multiplication circuit 23 as a clock signal. That is, the microcomputer 1 shifts to the high-speed operation capable of performing digital control of the capstan motor of the video mechanism 3 and the like. In this state, the microcomputer 1 controls the operation specified by handling from the outside.

When a state transition instruction to the standby state is given, the microcomputer 1 switches connection of the switch 15 for feeding an output of the oscillation circuit 13 to the CPU 11. Next, the microcomputer 1 stops the power supply to the video mechanism 3, the video circuit unit 4, and other circuits.

As described above, in the embodiment, the output signal generated in the indispensable block as the processor, namely, the reference signal generating circuit 6 is fed into the microcomputer 1 as a clock signal, thus the number of circuit parts is not increased and a crystal unit for generating a control clock signal at the operation time of the main unit can be made unnecessary.

If Y/C-IC 101 having the video circuit unit 4, the Y/C separation circuit 24, and the oscillation circuit 22 and CCD-IC 102 having the CCD 8 and the multiplication circuit 23 are provided, the reference signal generating circuit 6 is made up of the crystal unit 21, a part of the Y/C-IC 101, and a part of the CCD-IC 102.

Second Embodiment

By the way, in the first embodiment, the clock transmission path from the reference signal generating circuit 6 to the microcomputer 1 may become long. In such a case, the clock transmission path becomes easily affected by external noise such as electrostatic noise and lowers in noise resistance. As a result, when external noise is given, the microcomputer 1 is likely to run away out of control. A video signal processor of a second embodiment can prevent external noise from causing a microcomputer to run away out of control even if the clock transmission path becomes long.

Figure 4:
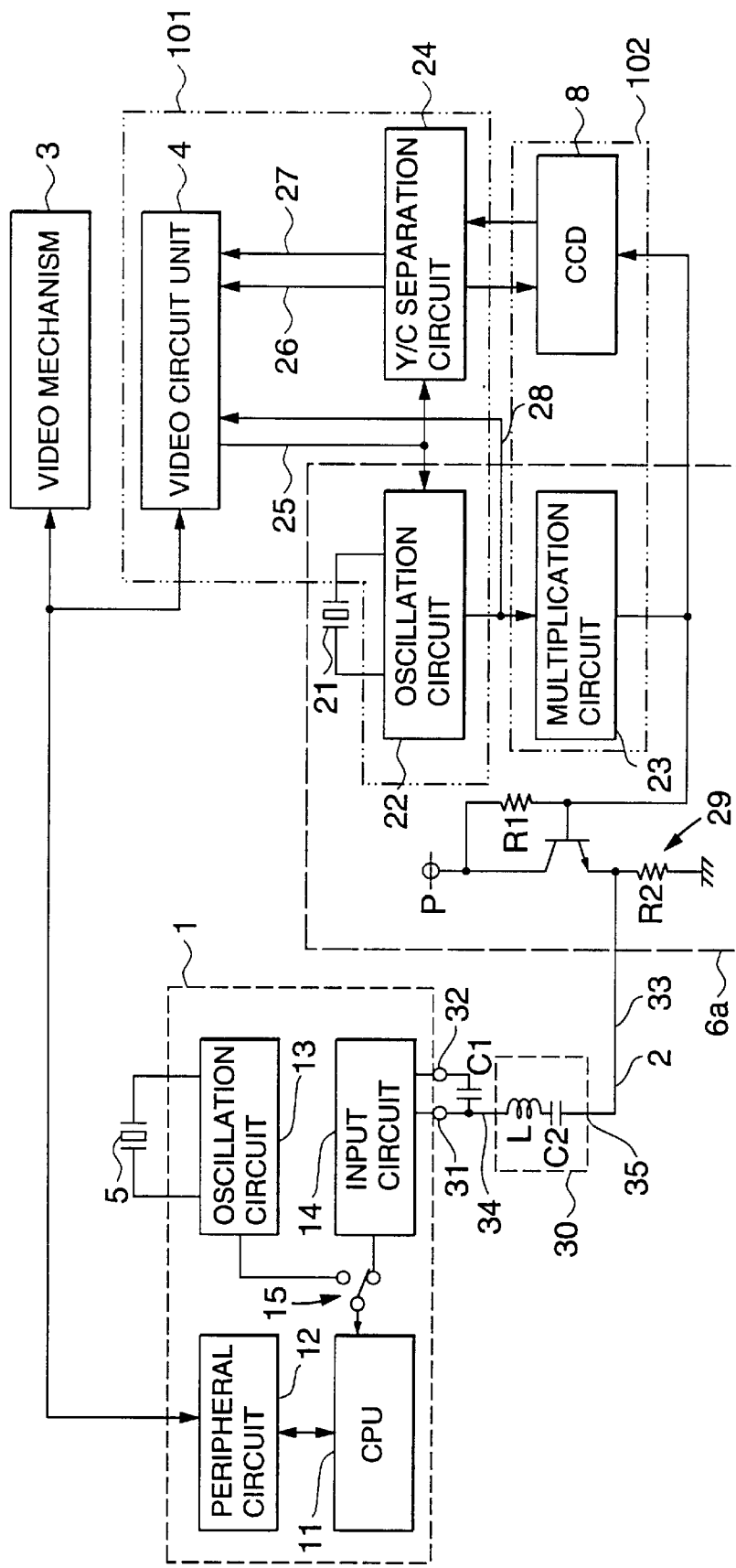
FIG. 4 is a block diagram showing the electric configuration of a second embodiment of the invention.

FIG. 4 is a block diagram showing the electric configuration of a video signal processor according to the second embodiment of the invention. Components identical with or similar to those in the first embodiment previously described with reference to FIG. 3 are designated by the same reference numerals in FIG. 4 and will not be discussed again.

In the second embodiment, a reference signal generating circuit 6a includes an oscillation circuit 22 to which a crystal unit 21 is connected, a multiplication circuit 23, and an emitter-follower circuit 29. An output signal of the multiplication circuit 23 is supplied via the emitter-follower circuit 29 and a series resonance circuit 30 to a clock signal terminal 31 of a microcomputer 1. A capacitor C1 having a capacity where impedance becomes nearly zero at the clock signal frequency is connected between clock signal terminals 31 and 32.

The emitter-follower circuit 29 is made up of a transistor Q and two resistors R1 and R2. The collector of the transistor Q is connected to a positive power supply P. The emitter is grounded via the resistor R2. The base is connected to the positive power supply P via the resistor R1. Further, the emitter of the transistor Q is led to a clock signal transmission path 2 as a low-impedance output.

The series resonance circuit 30 is a block consisting of a coil L and a capacitor C2 contained in a shielding case and is located near the clock signal terminals 31 and 32. Thus, a transmission path 34 connecting the series resonance circuit 30 and the clock signal terminals 31 and 32 is made extremely short. The resonance frequency is set to 14 MHz, which is substantially equal to the clock signal frequency given to the microcomputer 1.

Figure 5:
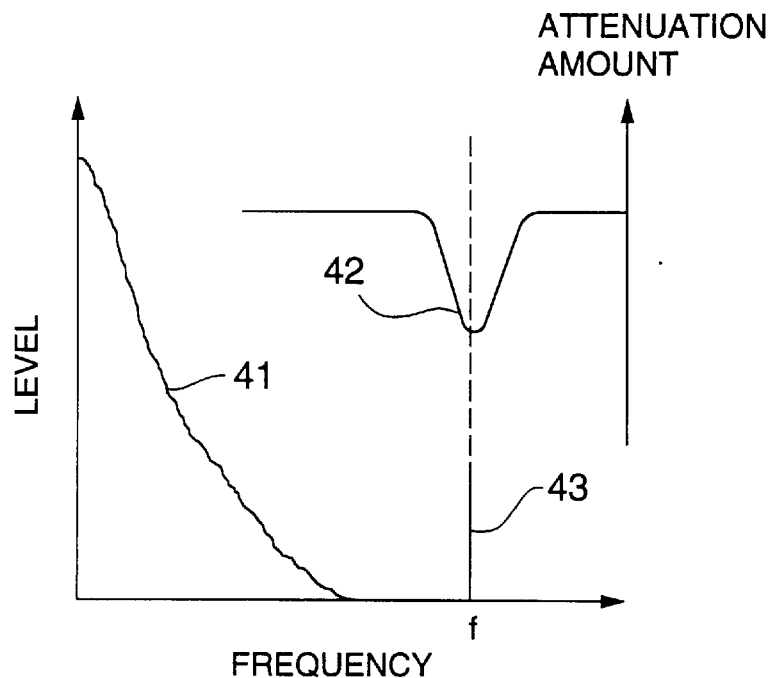
FIG. 5 is an illustration showing frequency distribution of external noise and clock signal and a pass characteristic of a series resonance circuit.
Figure 6:
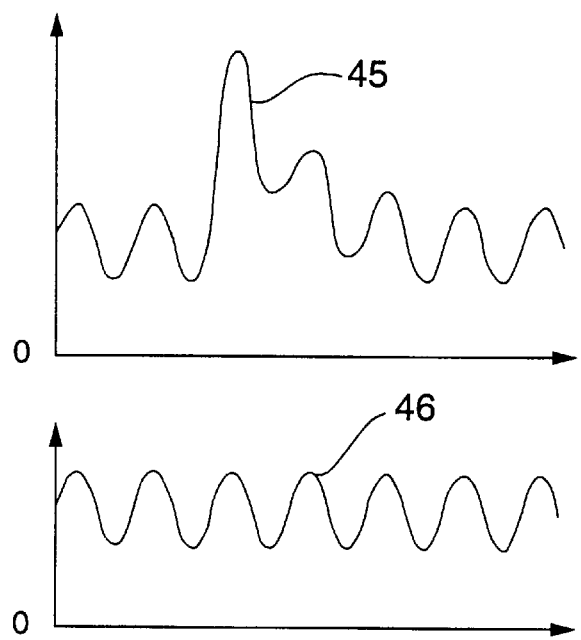
FIG. 6 is an illustration showing clock signal waveforms of the main portion when external noise is given.

FIG. 5 is an illustration showing frequency distribution of external noise and clock signal and a pass characteristic of the series resonance circuit. FIG. 6 is an illustration showing clock signal waveforms of the main portion when external noise is given. The operation of the embodiment having the above-described configuration will be discussed with reference to FIGS. 6 and 7 as required.

Assume that external noise such as electrostatic noise is given. At this time, little external noise is superposed on the transmission path 34 connecting the series resonance circuit 30 and the clock signal terminals 31 and 32 because the transmission path 34 is short and impedance of the clock signal terminals 31 and 32 is low. A transmission path 33 from the reference signal generating circuit 6 to the series resonance circuit 30 is driven at low impedance by the emitter-follower circuit 29, thus is hard to be affected by external noise. However, when the external noise level is large, external noise at a level affecting the operation of the microcomputer 1 is superposed on the transmission path 33.

In the frequency distribution of the external noise superposed on the transmission path 33, components with strong signal strength center around low frequencies as indicated by reference numeral 41 in FIG. 5, and signal components in the frequency range of several MHz or more are substantially zero. That is, external noise component becomes a level that can be ignored near frequency f of spectrum 43 of the clock signal. Thus, the signal of a terminal 35 of the series resonance circuit 30 at the instant when the external noise is given becomes a waveform where a single-shot low-frequency component is superposed on the clock signal, as shown by reference numeral 45 in FIG. 6.

On the other hand, the resonance frequency of the series resonance circuit 30 is 14 MHz and substantially equals the clock signal frequency f (14.32 MHz). Thus, in the pass characteristic of the series resonance circuit 30, the attenuation amount reaches the minimum near the frequency f as shown by a curve 42 in FIG. 5. As a result, of the external noise and clock signal given to the terminal 35, only the latter passes through the series resonance circuit 30. That is, the series resonance circuit 30 blocks the external noise passing through. Resultantly, the signal led to the clock terminals 31 and 32 becomes a waveform shown by reference numeral 46 in FIG. 6 with only the clock signal from which the external noise component has been removed.

As described above, if external noise is superposed on the clock signal transmission path 33, only the clock signal is led to the clock signal terminals 31 and 32 of the microcomputer 1. Thus, the microcomputer 1 performs the operation in accordance with the clock signal. That is, even when external noise is given, the microcomputer 1 does not run away out of control and executes the predetermined operation.

Third Embodiment

Figure 7:
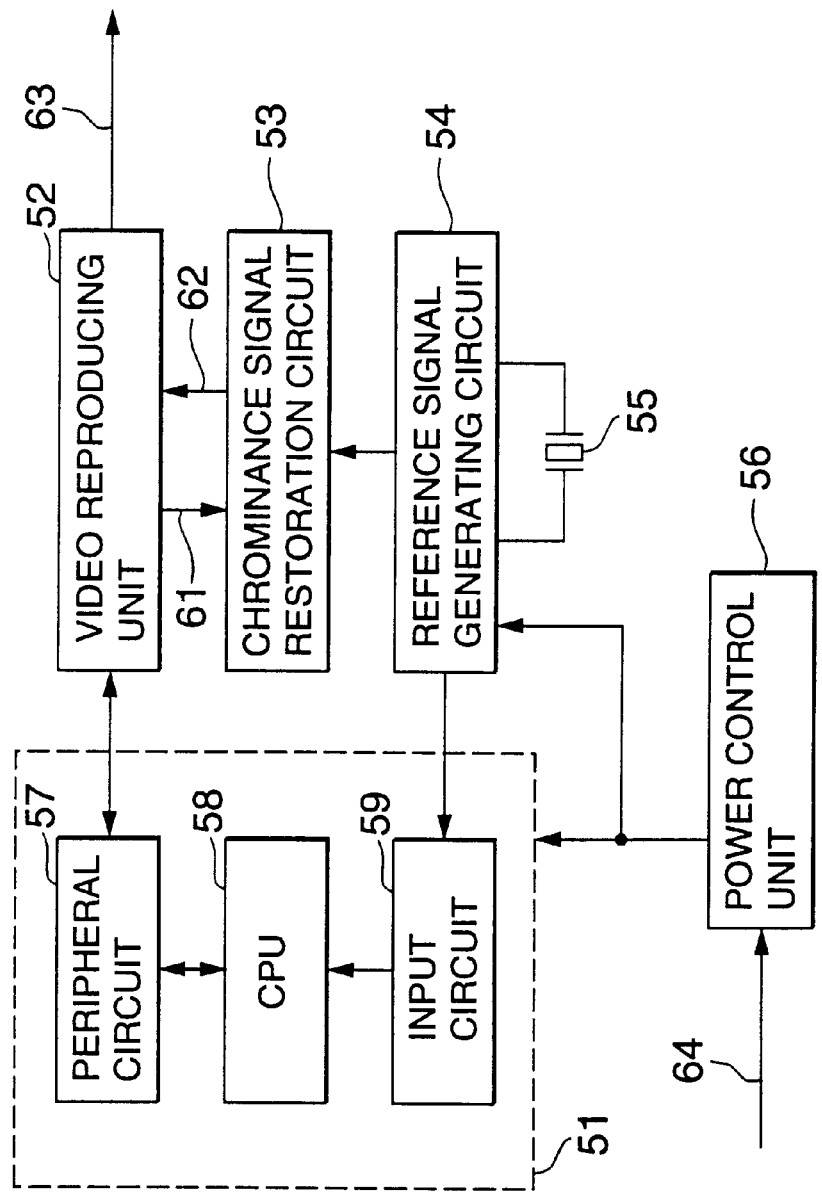
FIG. 7 is a block diagram showing the electric configuration of a third embodiment of the invention.

FIG. 7 is a block diagram showing the electric configuration of a video signal recording medium reproducer according to a third embodiment of the invention.

The video signal recording medium reproducer according to the invention is an apparatus for reproducing a recording medium on which a video signal such as an NTSC, PAL, or SECAM signal is recorded. The embodiment provides a video cassette player for reproducing a video cassette on which an NTSC signal is recorded. The video cassette player includes a microcomputer 51, a video reproducing unit 52, a chrominance signal restoration circuit 53, a reference signal generating circuit 54, and a power control unit 56.

The microcomputer 51, which is a block for controlling the video cassette player operation, includes a CPU 58 which is the nucleus of control, a peripheral circuit 57 which serves as an interface between the CPU 58 and the outside, and an input circuit 59 to which an external clock signal is input.

The video reproducing unit 52 is a block including a rotary head, a capstan motor, a loading mechanism, a reproduced signal processing circuit and the like. The rotation speed of the capstan motor, loading operation, or the like, is controlled by the microcomputer 51 bidirectionally connected to the video reproducing unit 52.

The chrominance signal restoration circuit 53 is a block for converting a lower-frequency converted chrominance signal 61 taken out by the video reproducing unit 52 into a chrominance signal (carrier chrominance signal) carried by a carrier 62 based on a reference signal generated by the reference signal generating circuit 54.

The reference signal generating circuit 54 is a block using a 3.58-MHz crystal unit 55 as an oscillation device for generating a reference signal of the carrier chrominance signal 62. The reference signal generating circuit 54 sends the generated reference signal to the chrominance signal restoration circuit 53 and also to the input circuit 59 as a clock signal.

In the standby state in which the commercial power is supplied and the video cassette player operation is not performed, the power control unit 56 supplies power to the microcomputer 51 and the reference signal generating circuit 54. When the operation state is entered, the power control unit 56 supplies power to all the blocks.

The operation of the embodiment having the above-described configuration will be discussed.

When the commercial power is supplied, the power is always supplied to the microcomputer 51 and the reference signal generating circuit 54. Thus, a reference signal generated by the reference signal generating circuit 54 is fed into the input circuit 59. Thus, when the commercial power is supplied, the microcomputer 51 always operates with the reference signal generated by the reference signal generating circuit 54 as a clock signal.

That is, in the standby state, the microcomputer 51 receives an operation start instruction and performs control for supplying power to all the blocks. Next, the microcomputer 51 performs control in accordance with an instruction for reproduction or the like, thereby reproducing a video cassette (not shown). The reproduced video signal is sent to the outside as an output signal 63.

Fourth Embodiment

Figure 8:
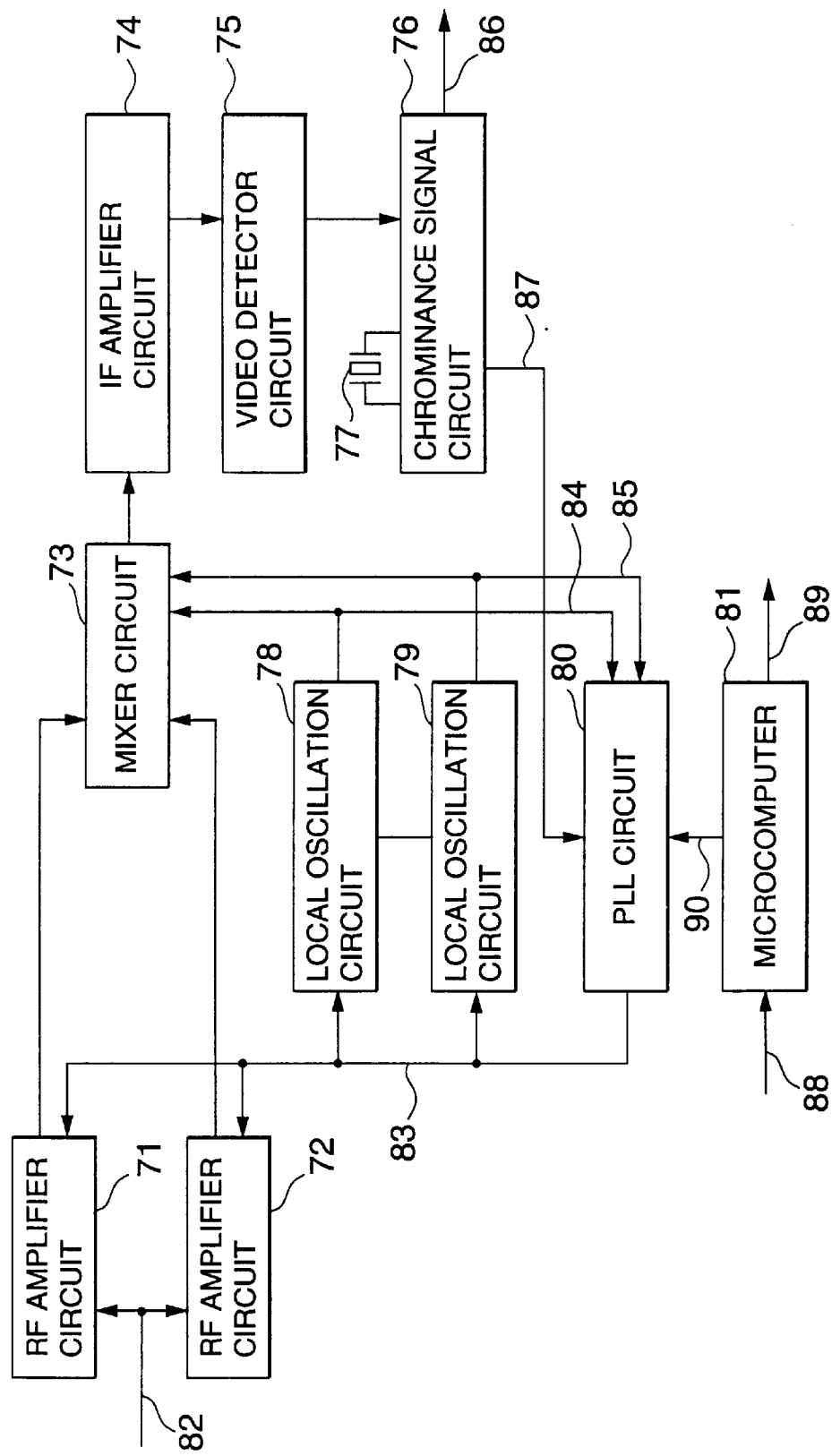
FIG. 8 is a block diagram showing the electric configuration of a fourth embodiment of the invention.

FIG. 8 is a block diagram showing the electric configuration of a video signal receiver according to a fourth embodiment of the invention. Specifically, the embodiment provides a video cassette recorder. Thus, FIG. 8 shows only blocks for receiving a video signal in the video cassette recorder.

In FIG. 8, a radio frequency (RF) amplifier circuit 71 is a block for performing high-frequency amplification of an ultra high frequency (UHF) band of an output signal 82 from an antenna. In the RF amplifier circuit 71, the frequencies of the signal to be amplified are set by the voltage of an output signal 83 sent from a PLL circuit 80. An RF amplifier circuit 72 is a block for performing high-frequency amplification of a very high frequency (VHF) band of the output signal 82. In the RF amplifier circuit 72, the frequencies of the signal to be amplified are set by the voltage of the output signal 83.

A mixer circuit 73 is a block for performing frequency conversion of a signal in the UHF or VHF band. When the UHF band is received, the mixer circuit 73 performs frequency conversion of a UHF band signal amplified by the RF amplifier circuit 71 to an intermediate-frequency signal based on a local oscillation signal 84 output from a local oscillation circuit 78. When the VHF band is received, the mixer circuit 73 performs frequency conversion of a VHF band signal amplified by the RF amplifier circuit 72 to an intermediate-frequency signal based on a local oscillation signal 85 output from a local oscillation circuit 79. Then, the mixer circuit 73 sends the resulting intermediate-frequency signal to an IF amplifier circuit 74.

The IF amplifier circuit 74 is a block for amplifying the intermediate-frequency signal output by the mixer circuit 73. The IF amplifier circuit 74 sends the amplified intermediate-frequency signal to a video detector circuit 75.

The video detector circuit 75 is a block for detecting the intermediate-frequency signal amplified by the IF amplified circuit 74. The video detector circuit 75 sends the detected output to a chrominance signal circuit 76.

The chrominance signal circuit 76 is a block for generating three chrominance signals 86 of red, green, and blue from the video signal detected by the video detector circuit 75. The chrominance signal circuit 76 has a crystal unit 77 of the same frequency as that of a burst signal. The oscillation frequency of the crystal unit 77 is a frequency corresponding to a video signal to be received. For example, if the signal to be received is an NTSC signal, the oscillation frequency is about 3.58 MHz.

More particularly, the chrominance signal circuit 76 controls oscillation of the crystal unit 77, thereby generating a second reference signal phase-synchronized with the burst signal. After separating the video signal into a luminance signal and a chrominance signal, the chrominance signal circuit 76 generates a color-difference signal from the resulting chrominance signal based on the second reference signal. The chrominance signal circuit 76 performs predetermined processing from the generated color-difference signal and the luminance signal for generating chrominance signals of red, green, and blue, and sends the generated chrominance signals 86 to the outside. The chrominance signal circuit 76 also sends the generated second reference signal 87 to the PLL circuit 80 as a first reference signal.

The local oscillation circuit 78 is a voltage-controlled oscillation circuit having an oscillation frequency changing with the voltage of the output 83 of the PLL circuit 80. The local oscillation circuit 78 generates the local oscillation signal 84 when a signal in the UHF band is received and sends the generated local oscillation signal 84 to the mixer circuit 73. The local oscillation circuit 79 is a voltage-controlled oscillation circuit having an oscillation frequency changing with the voltage of the output signal 83 of the PLL circuit 80. The local oscillation circuit 79 generates the local oscillation signal 85 when a signal in the VHF band is received, and sends the generated local oscillation signal 85 to the mixer circuit 73.

The PLL circuit 80 is a block for controlling the oscillation frequencies of the local oscillation circuits 78 and 79 and setting frequencies of the signals to be amplified by the RF amplifier circuits 71 and 72. The PLL circuit employs the same configuration as used in the conventional system. That is, it is adopted to perform PLL control using a frequency signal near 4 MHz at which the crystal unit manufacturing cost becomes the most inexpensive as the first reference signal.

More particularly, the second reference signal 87 near 4 MHz sent from the chrominance signal circuit 76 is handled as the first reference signal and a signal is generated by dividing the second reference signal 87 at a predetermined ratio. Also, a signal is generated by dividing the local oscillation signal 84 or 85 at a ratio specified by the microcomputer 81. A phase comparison is made between the divided second reference signal 87 and the divided local oscillation signal 84 or 85. Then, the voltage of the output signal 83 is controlled in accordance with the comparison result, thereby setting the frequency of the local oscillation signal 84 or 85 to a frequency corresponding to the frequency of the signal to be received.

The microcomputer 81 is a block for controlling the operation required for a video cassette recorder based on an output signal 88 from operation panel switches, detection switches, sensors, and the like. The microcomputer 81 executes predetermined operation at high speed based on a clock signal of a frequency such as 12 MHz. That is, the microcomputer 81 sends a control output signal 89 to a predetermined block (not shown) for controlling the operation of the video cassette recorder. The microcomputer 81 also sends a command output signal 90 to the PLL circuit 80 for controlling the frequency dividing ratio in the PLL circuit 80.

The operation of the embodiment having the above-described configuration will be discussed.

Assuming that the frequency of the second reference signal 87 fed into the PLL circuit 80 is $f_{ref}$, that the ratio dividing the second reference signal 87 is $D_{ref}$, that the frequency required as the local oscillation signal 84 is $f_{osc}$, and that the ratio dividing the local oscillation signal 84 is $D_{osc}$, the following relational expression holds:

$$f_{ref}/D_{ref} = f_{osc}/D_{osc} \qquad (1)$$

Thus, the microcomputer 81 specifies the frequency dividing ratio $D_{osc}1$ satisfying that $$3.58/D_{ref} = f_{osc}/D_{osc}1 \qquad (2)$$

for the PLL circuit 80 for generating the local oscillation signal 84 of the required frequency to receive a predetermined frequency.

On the other hand, when the frequency of the second reference signal 87 is 4 MHz (frequency in the conventional system), the ratio dividing the local oscillation signal 84, $D_{osc}2$, is shown as follows:

$$4/D_{ref} = f_{osc}/D_{osc}2 \qquad (3)$$

The relation between the ratios $D_{osc}1$ and $D_{osc}2$ is as follows:

$$D_{osc}1/D_{osc}2 = 4/3.58 \qquad (4)$$

When the reception frequencies are the same, the ratio dividing the local oscillation signal 84 becomes a factor of 4/3.58 by changing the frequency of the second reference signal 87 from 4 MHz to 3.58 MHz. However, the PLL circuit 80 is adapted to allow 4/3.58 in the range in which the ratio dividing the local oscillation signal 84 can be set. Thus, even if the PLL circuit 80 used in the conventional system is used as it is, all required frequency ranges can be received.

The above-described operation is also performed when a VHF band signal is received. The PLL circuit 80 divides the local oscillation signal 85 at the ratio as specified by the microcomputer 81 for setting the frequency of the local oscillation signal 85 to a required frequency.

In the embodiment, the second reference signal, which is a reference signal used for demodulation of the chrominance signal, is fed into the PLL circuit 80 as the first reference signal. Therefore, the signal having a predetermined accuracy is fed into the PLL circuit 80 as the first reference signal without providing any exclusive oscillation device for generating the first reference signal.

The embodiment has been discussed by assuming that the signal to be received is an NTSC signal, but the invention is not limited to the embodiment and may also be applied when the signal to be received is a PAL or SECAM signal.

Further, the embodiment has been discussed by applying the invention to the video cassette recorder, but the invention may also be applied to other apparatus, such as a television set with a video cassette recorder.

Fifth Embodiment

Figure 9:
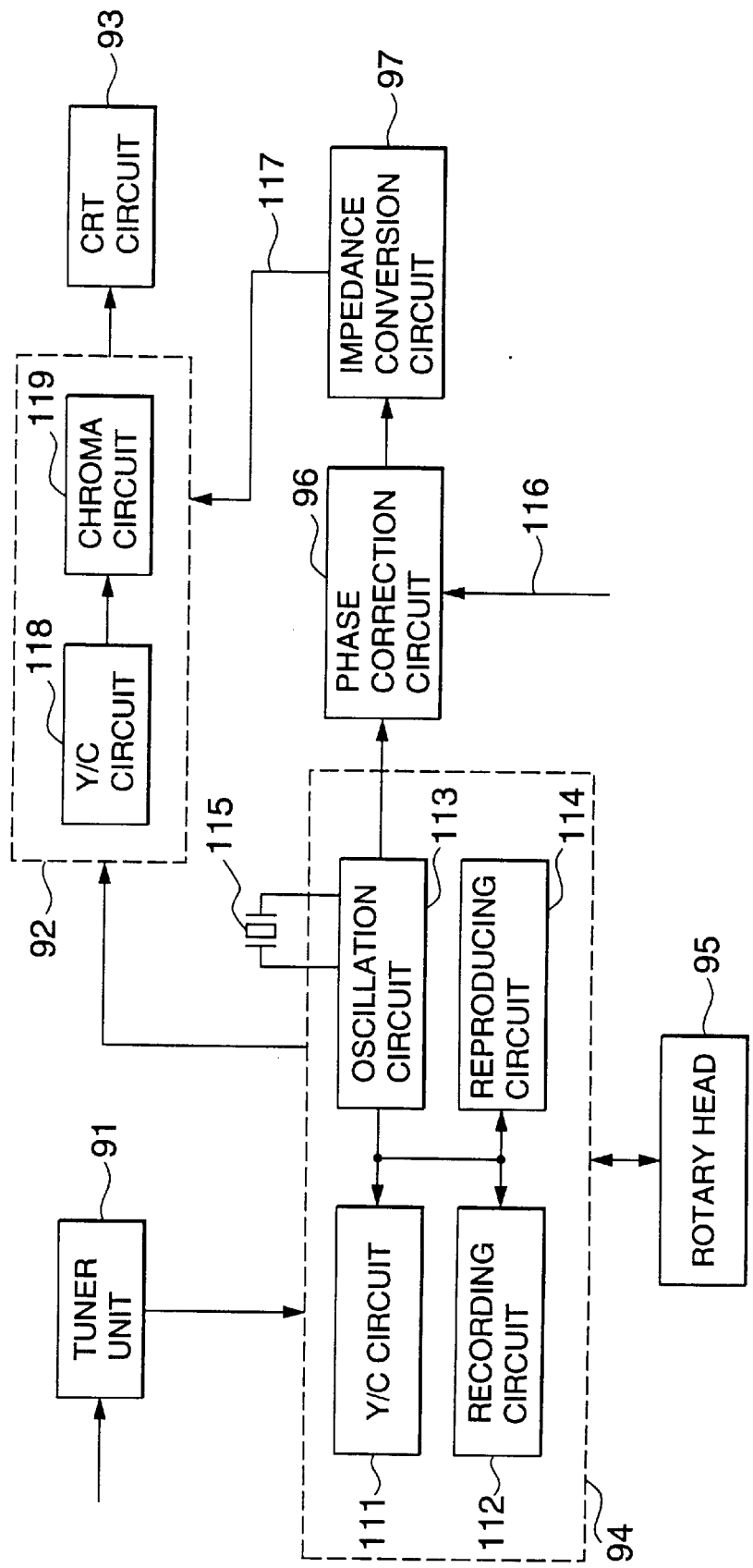
FIG. 9 is a block diagram showing the electric configuration of a fifth embodiment of the invention.

FIG. 9 is a block diagram showing the electric configuration of a video cassette recorder with a television set according to a fifth embodiment of the invention.

The embodiment provides an apparatus applied to an NTSC signal, which includes a tuner unit 91, a video signal processing unit 92, a CRT unit 93, a recording/reproducing unit 94, a rotary head 95, a phase correction circuit 96, and an impedance conversion circuit 97. At the recording time, this apparatus can display only the video signal being recorded.

The tuner unit 91 is a block for applying predetermined processing to a received signal for taking out a video signal. The tuner unit 91 outputs the taken-out video signal to the recording/reproducing unit 94.

The recording/reproducing unit 94 is a block for applying predetermined processing to the video signal output from the tuner unit 91 to provide a record signal and outputting the record signal to the rotary head 95 at the recording time. Further, the recording/reproducing unit 94 applies predetermined processing to a reproduction signal output from the rotary head 95 to provide a video signal and outputs the video signal to the video signal processing unit 92 at the reproducing time. When the operation other than the reproducing operation, such as recording, fast forwarding, rewinding, or simple television operation, is performed, the recording/reproducing unit 94 not only uses the video signal output from the tuner unit 91 for internal processing, but also outputs it to the video signal processing unit 92. More particularly, the recording/reproducing unit 94 includes a Y/C circuit 111, a recording circuit 112, an oscillation circuit 113, and a reproducing circuit 114.

The Y/C circuit 111 separates the video signal output from the tuner unit 91 into a luminance signal and a chrominance signal through a comb filter operating with a clock signal provided by multiplying a signal output from the oscillation circuit 113. It also outputs the resulting luminance signal and chrominance signal to the recording circuit 112.

The recording circuit 112 generates a frequency modulation (FM) signal based on the luminance signal output from the Y/C circuit 111 and a lower frequency converted chrominance signal provided by making frequency conversion of the chrominance signal output from the Y/C circuit 111. The recording circuit 112 also outputs the generated signal to the rotary head 95 as a recording signal.

The reproducing circuit 114 reproduces the luminance signal by demodulating the FM signal of reproduced signals output from the rotary head 95 and also reproduces the chrominance signal by making frequency conversion of the lower-frequency converted chrominance signal. Then, the reproducing circuit 114 mixes the reproduced luminance and chrominance signals for providing a video signal and outputs the video signal to the video signal processing unit 92.

The oscillation circuit 113 is a block to which a 3.58-MHz crystal unit 115 is connected. At the operation time except the reproduction operation, the oscillation circuit 113 performs oscillation phase-synchronized with the burst signal of the video signal fed from the tuner unit 91 and outputs the oscillated signal to the Y/C circuit 111, the recording circuit 112, and the phase correction circuit 96. At the reproducing operation, the oscillation circuit 113 oscillates a reference signal of the burst signal and outputs the oscillated signal to the reproducing circuit 114 and the phase correction circuit 96.

The phase correction circuit 96 is a block for correcting the phase of the signal output from the oscillation circuit 113, and the correction amount varies depending on whether a control signal 116 is in high level or low level. The phase correction circuit 96 outputs the signal having the corrected phase to the impedance conversion circuit 97.

The impedance conversion circuit 97 is a block for converting the output impedance of the phase correction circuit 96 into a low impedance. Thus, the impedance conversion circuit 97 outputs the signal generated by the oscillation circuit 113 and having the phase corrected by the phase correction circuit 96 to the video signal processing unit 92 at the low impedance as a reference subcarrier 117.

The video signal processing unit 92 is a block for generating a primary color chrominance signal from the video signal in accordance with the reference subcarrier 117 output from the impedance conversion circuit 97. That is, when the operation except reproducing, such as picture recording or rewinding, is performed, the video signal processing unit 92 generates the primary color chrominance signal from the video signal input via the recording/reproducing unit 94 from the tuner unit 91. At the reproducing operation, the video signal processing unit 92 generates the primary color chrominance signal from the video signal generated by the recording/reproducing unit 94. The video signal processing unit 92 outputs the generated primary color chrominance signal to the CRT unit 93. Thus, the video signal processing unit 92 includes a Y/C circuit 118 and a chroma circuit 119.

The Y/C circuit 118 separates the video signal into a luminance signal and a chrominance signal through a comb filter operating with a clock signal provided by multiplying the reference subcarrier 117, and outputs the resulting luminance and chrominance signals to the chroma circuit 119.

The chroma circuit 119 generates the primary color chrominance signal from the luminance and chrominance signals output from the Y/C circuit 118 and the reference subcarrier 117.

The CRT unit 93 is a block for amplifying the primary color chrominance signal generated by the video signal processing unit 92 to a predetermined level and driving the CRT by the amplified primary color chrominance signal.

Figure 10:
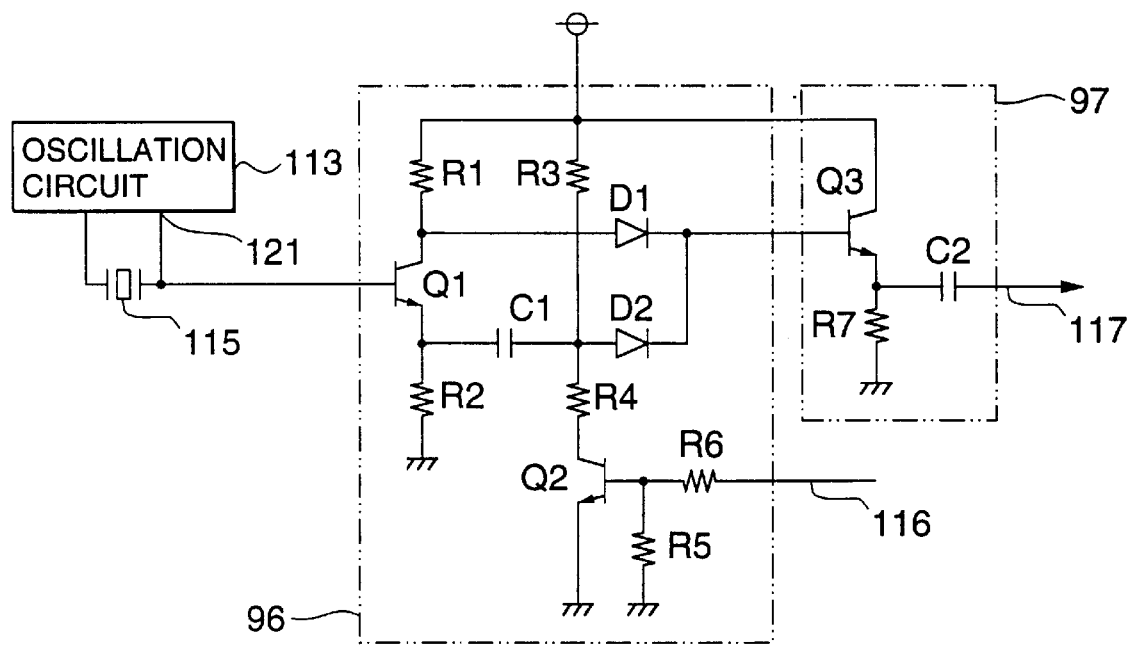
FIG. 10 is a circuit diagram showing the detailed circuit configuration of a phase correction circuit and an impedance conversion circuit.

The phase correction circuit 96 and the impedance conversion circuit 97 are located near the oscillation circuit 113. FIG. 10 shows the detailed circuit configuration of these blocks.

The phase correction circuit 96 includes six resistors R1–R6, one capacitor C1, two transistors Q1 and Q2, and two diodes D1 and D2. That is, one (121) of terminals for the crystal unit 115 of the oscillation circuit 113 is connected to the base of the transistor Q1. The collector of the transistor Q1 is connected via the resistor R1 to a positive power supply and the emitter is grounded via the resistor R2. Thus, a signal provided by inverting the signal waveform at the terminal 121 appears on the collector of the transistor Q1. Further, a signal in phase with the signal waveform at terminal 121 appears on the emitter of the transistor Q1.

The collector of the transistor Q1 is led via the diode D1 to the base of a transistor Q3. The emitter of the transistor Q1 is led via the capacitor C1 and the diode D2 to the base of the transistor Q3. When the transistor Q2 is turned off, the anode voltage of the diode D2 is set to a voltage substantially equal to the positive power supply. When the transistor Q2 is turned on, the anode voltage is set to a voltage divided by the resistors R3 and R4.

More particularly, the resistors R3 and R4 are set to values such that the divided voltage when the transistor Q2 is turned on becomes about 0.3 V. The resistors R1 and R2 are set to values such that the collector and emitter voltages of the transistor Q1 become 4.3 V and 3.2 V respectively.

Thus, when the control signal 116 goes high and the transistor Q2 is turned on, a current flowing into the diode D1 causes the cathode voltage of the diode D2 to become higher than the anode voltage, turning off the diode D2. On the other hand, when the control signal 116 goes low and the transistor Q2 is turned off, a current flowing into the diode D2 causes the cathode voltage of the diode D1 to become higher than the anode voltage, turning off the diode D1. Therefore, when the control signal 116 is in high level, a signal of the opposite phase to the phase at the terminal 121 is led to the base of the transistor Q3. This means that the phase is inverted. When the control signal 116 is in low level, a signal in phase at the terminal 121 is led to the base of the transistor Q3. This means that the phase is not corrected.

The impedance conversion circuit 97 includes the transistor Q3, a resistor R7, and a capacitor C2. The transistor Q3 outputs a signal in phase with a signal led to the base at a low impedance via the capacitor C2. That signal is led to the video signal processing unit 92 as the reference subcarrier 117.

Therefore, when the control signal 116 is in high level, the phase of the reference subcarrier 117 becomes a phase provided by inverting an output phase of the oscillation circuit 113. When the control signal 116 is in low level, the reference subcarrier 117 and the output of the oscillation circuit 113 become in phase with each other.

The operation of the embodiment having the above-described configuration will be discussed.

At the operation time except the reproducing operation, the oscillation circuit 113 executes oscillation phase-synchronized with the burst signal of the video signal output from the tuner unit 91. Thus, the signal at the terminal 121 and the burst signal become in phase with each other. On the other hand, at the reproducing time, the phase of the burst signal generated by the reproducing circuit 114 becomes a phase provided by inverting the phase at the terminal 121 because of the configuration of the reproducing circuit 114. That is, at the operation time except the reproduction operation, the relationship between the phase of the terminal 121 of the oscillation circuit 113 and the phase required as the reference subcarrier 117 becomes in-phase relationship.

However, at the reproducing time, the relationship between the phase at the terminal 121 and the phase required as the reference subcarrier 117 becomes opposite phase relationship.

Thus, at the recording time, fast forwarding, rewinding, or simple receiving, the level of the control signal 116 is set low and the reference subcarrier 117 is placed in phase at the terminal 121. Thus, the video signal processing unit 92 separates the video signal into a luminance signal and a chrominance signal with the output signal 117 of the impedance conversion circuit 97 as the reference subcarrier, and generates a primary color chrominance signal from the resulting luminance and chrominance signals and the reference subcarrier 117.

On the other hand, at the reproducing time, the level of the control signal 116 is set high and the phase of the reference subcarrier 117 is made opposite to that at the terminal 121. Therefore, the reference subcarrier 117 becomes in phase with the burst signal in the video signal output from the recording/reproducing unit 94. Thus, the video signal processing unit 92 generates a primary color chrominance signal from the video signal generated by the recording/reproducing unit 94 in accordance with the reference subcarrier 117.

Resultantly, the primary color chrominance signal generated by the video signal processing unit 92 becomes a chrominance signal of the same hue at the reproducing time and the operation time except the reproducing operation.

As described above, the embodiment eliminates the need for the video signal processing unit 92 to generate the reference subcarrier, so that the number of crystal units to be used can be reduced.

The embodiment has been discussed by applying the invention to the video cassette recorder with a television set for displaying an image by an NTSC signal, but the invention is not limited to the embodiment and may also be applied to a video cassette recorder with a television set for displaying an image by a PAL signal.

If the burst signal in the video signal generated by the recording/reproducing unit 94 is generated as a signal in phase with the output of the oscillation circuit 113, the phase correction circuit 96 may be omitted.

What is claimed is:

1. A video cassette recorder with a television set comprising:

a recording/reproducing unit for generating a recording signal based on a video signal fed from a tuner unit and outputting the generated recording signal to a rotary head at a recording time and for generating a video signal based on a reproduced signal output from said rotary head and outputting the generated video signal at a reproducing time; and a video signal processing unit for generating a primary color chrominance signal from the same video signal as the video signal fed into said recording/reproducing unit at the recording time and for generating a primary color chrominance signal from the video signal generated by said recording/reproducing unit at the reproducing time, wherein said recording/reproducing unit includes an oscillation circuit for executing oscillation phase-synchronized with a burst signal of the video signal fed from said tuner unit at an operation time except during a reproducing operation and for oscillating a reference signal used as a reference for the burst signal, and further comprising an impedance conversion circuit arranged to receive an output of said oscillation circuit that has been phase-corrected, convert the phase-corrected output of the oscillation circuit into a low-impedance output signal, and supply the low impedance output signal to said video signal processing unit as a reference subcarrier at the reproducing time.

2. The video cassette recorder with a television set as claimed in claim 1, further comprising a phase correction circuit connected between the oscillation circuit and said impedance conversion circuit for correcting a phase of the reference subcarrier, wherein a phase correction amount of said phase correction circuit is a phase difference between an output phase of said oscillation circuit and a required phase of the reference subcarrier, whereby said phase correction amount is different during a reproducing operation than it is during other operation times.

3. The video cassette recorder with a television set as claimed in claim 1, wherein said impedance conversion circuit is an emitter-follower circuit.

* * * * *